Patented Oct. 7, 1941

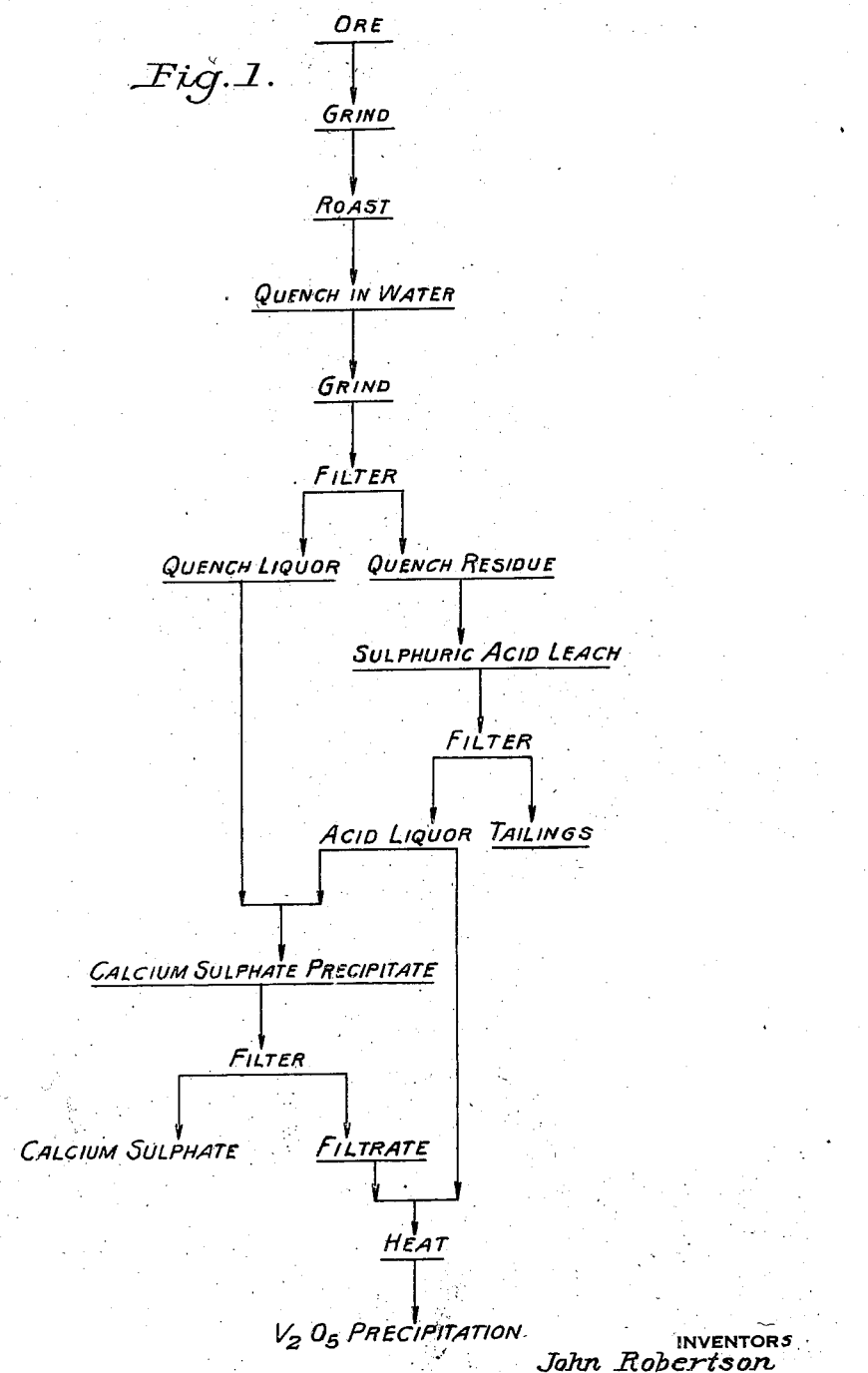

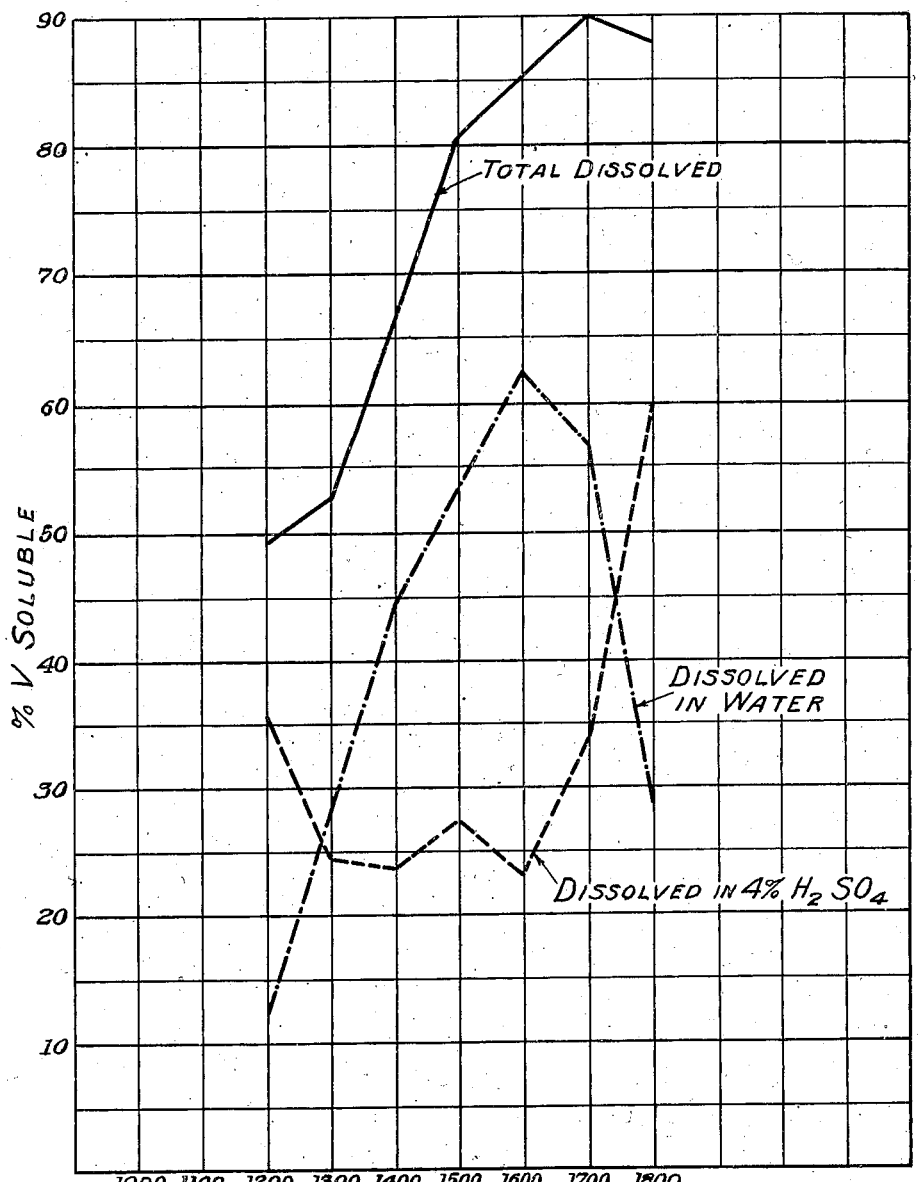

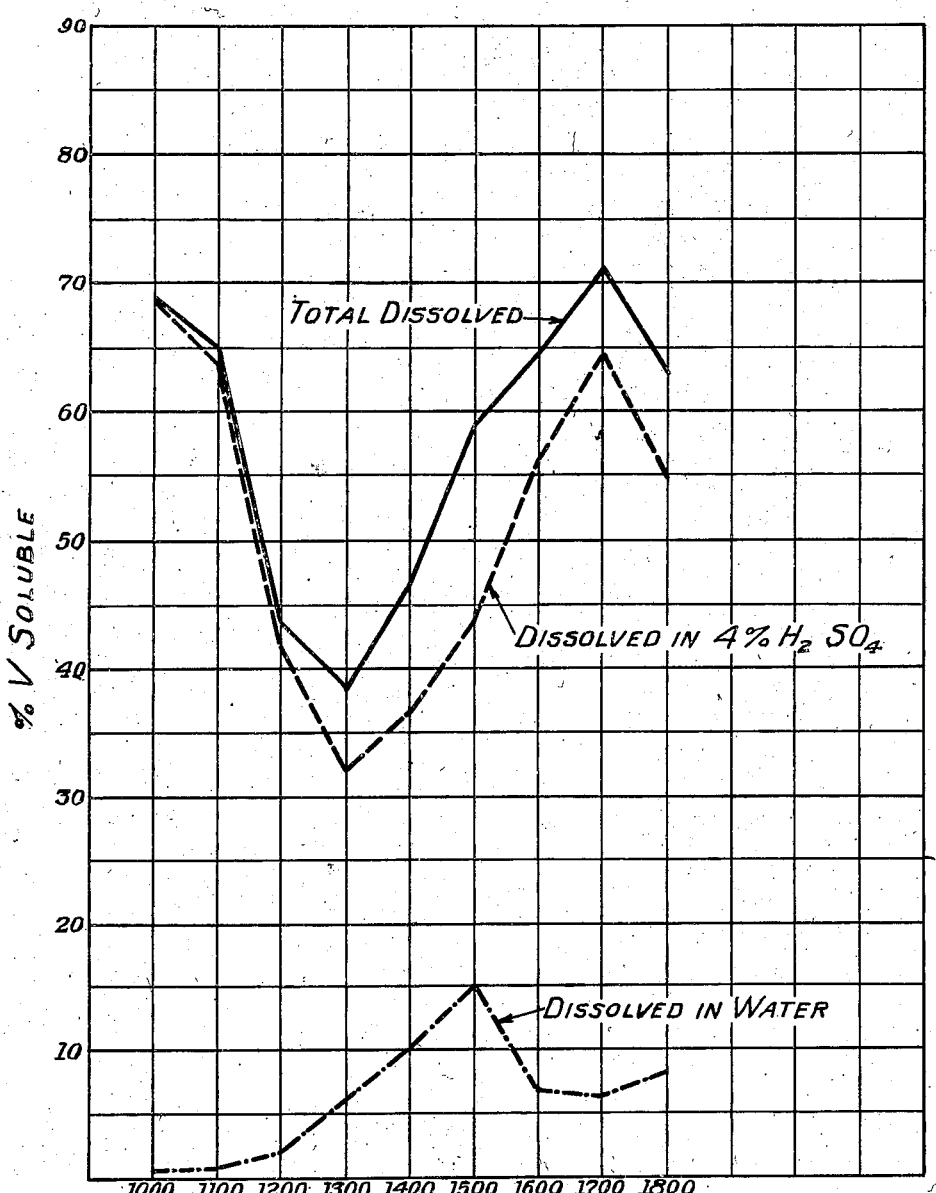

2,257,978

UNITED STATES PATENT OFFICE 2,257,978

EXTRACTION OF VANADIUM VALUES FROM VANADIUM-BEARING MATERIAL

John Robertson, Ricran, Peru, Holbert Earl Dunn, Crafton, Pa., and Archibald Alexander Sproul, Rye, N. Y., assignors to Vanadium Corporation of America, Bridgeville, Pa., a corporation of Delaware Application February 23, 1940, Serial No. 320,458

16 Claims. (Cl. 23—18)

This invention relates to a process for recovering vanadium values from ores and other vanadium-bearing materials. The term vanadium values is used as a generic expression to include the vanadium recovered whether as vanadium or as a compound existing in the ore or as a compound synthesized from the ore.

This application is a continuation-in-part of our co-pending application, Serial No. 221,610, filed July 27, 1938, which application is a continuation-in-part of our application, Serial No. 87,784, filed June 27, 1936.

The present invention provides a process for recovering vanadium values from ores or other vanadium-bearing materials which is less costly and in which the recovery is more nearly complete than in the methods heretofore employed. It eliminates the use of fluxing or transposing agents during the roast and the roast is so carried out that a large proportion of the vanadium content is rendered water soluble, thus enabling the use of a water quench in place of an acid or alkaline leach. The water quench is, however, followed by an acid leach to extract further portions of vanadium.

In the accompanying drawings:

Fig. 1 is a flow sheet illustrating the preferred manner of carrying out the process;

Fig. 2 is a chart illustrating the solubility secured by quenching at the roasting temperature; and Fig. 3 is a similar chart illustrating the solubilities when the ore is allowed to first cool in air before quenching.

The most common method of recovering vanadium value from its ores consists essentially of roasting the ore with a suitable fluxing or transposing agent or agents which convert the vanadium content into soluble form. Such transposing agents may be salt or soda ash, or both, or other suitable material. The roasted ore is thereafter leached with water. The vanadium-bearing liquor is filtered off and the vanadium content is precipitated from this liquor by the addition of the required amount of sulphuric acid. The cost of the transposing agent added to the roast constitutes a large item of expense which is eliminated in our process. Furthermore, in our process the amount of acid required is considerably reduced.

We have found that normally water insoluble vanadium compounds in ores or other material which contain vanadium and compounds of calcium or other alkaline earth metals may be rendered water soluble without the necessity of adding transposing agents, provided that the roast is carried out at the proper temperature and using the proper temperature-time cycle both for the heating and cooling operation. In respect to the latter, a further condition is that the roasted ore must be cooled at a sufficiently rapid rate, in order not to permit the soluble calcium vanadate formed during the roasting to be converted to any appreciable extent into a water insoluble form. We have found that different vanadium ores behave differently in these roasting and cooling operations and that there exists not only an optimum temperature and time cycle during the heating or roasting stage but also a critical cooling rate in the final cooling stage, which critical cooling rate must be exceeded, in order to prevent retransformation of the soluble vanadate to an insoluble vanadate.

We have found that when an ore containing compounds of vanadium and calcium is roasted at different temperatures, a series of calcium vanadates are formed, some of which are water insoluble and others of which are water soluble. Thus, at a roasting temperature between about 1000° F. and 1200° F. the water insoluble calcium ortho-vanadate is formed. Therefore, if such roasting temperatures are employed, it is necessary to employ a transposing agent such as sodium chloride, sodium sulphate or sodium carbonate in the roast, in order to render the roast water soluble.

It is well recognized by those skilled in the art of extracting metals from ores that within a given type the chemical composition, particularly with respect to major constituents (the metals that it is desired to extract) may be substantially uniform from lot to lot. Yet the minor constituents (principally gangue materials) may vary widely without appearing to alter the general characteristics of the ore; nevertheless, there is often apparent failure of a particular procedure to extract the above mentioned major constituents until some disturbing feature which may be a difference principally of physical character has been brought under control. In line with this generally accepted phenomena, we have found in studying vanadium ores that in the formation during roasting of the maximum amount of soluble calcium vanadate the optimum temperature-time cycle varies somewhat with the particular type of ore and the particular lot of any type being treated. There is, therefore, a necessary range of operating conditions required to satisfactorily carry out our process with the various ores to which it is applicable, in order to secure maximum extraction. In every case, however, the treatment involved is a roasting to convert vanadium present in the ore into soluble calcium or alkaline earth metal vanadate and then by cooling more quickly than the afore-mentioned critical rate to effectively preserve the water soluble vanadate and prevent its transformation into the insoluble calcium vanadate stable at room temperature that would result from slow cooling. The soluble calcium vanadate is thereafter extracted with water and any remaining vanadium is extracted by acid leaching, thus resulting as heretofore noted in a considerable saving in acid consumption. Water cooling appears to be more rapid for all ores than this critical cooling rate and hence two operations may be combined by quenching in water as hereafter described.

The initial stage of the roasting operation preferably is carried out at some temperature above 1200° F. This temperature is generally between 1400° F. and 1800° F., preferably about 1600° F., but may go up as high as 2000° F. or even higher, if the maximum temperature and time cycle are not sufficient to cause appreciable sintering of the material. Subsequent to the initial heating, the temperature may be lowered slowly or rapidly to some temperature not below about 1000° F. before the rapid cooling at a rate greater than the above noted critical cooling rate needs to be carried out. The temperature-time cycle productive of maximum water extraction or maximum total extraction by leaching in water and subsequent leaching in acid will vary with different ores and the process envisages the adjustment of this temperature-time cycle in accordance with the needs of each case.

As an example, a characteristic ore treated in accordance with the present invention had the following composition:

| | Percent |
|---|---|
| V | 3.54 |
| CaO | 15.53 |
| S$O_3$ | 25.91 |
| $Al_2O_3$ | 11.18 |
| $SiO_2$ | 24.44 |
| $Fe_2O_3$ | 1.95 |

Such an ore may be roasted at a temperature of about 1650° F. and immediately quenched in water, or it may be roasted at a higher temperature but short of sintering and allowed to cool quickly or slowly to about 1650° F. and then immediately quenched in water. If the water quench liquors are allowed to slowly concentrate at a temperature slightly above room temperature, orange-red crystals of about ½ inch size separate from the supernatant liquor. These crystals when analyzed have been found to have the following analysis:

| | Percent |
|---|---|
| $V_2O_5$ | 68.92 |
| CaO | 10.62 |
| $H_2O$ | 20.46 | which corresponds to the formula $$CaO.2V_2O_5.6H_2O$$

or $$CaV_4O_{11}.6H_2O$$

These crystals were readily dissolved in water and their vanadium contact precipitated as vanadium pentoxide by addition of a suitable amount of the acid leach liquor as hereinafter described in our preferred process. These crystals are believed to be calcium deuterotetravanadate.

If the roast is carried out at too low a temperature, or at too high a temperature, and is immediately quenched in water, the water soluble calcium vanadate is not formed. If a roasting temperature above 2000° F. is employed on the ore previously described, and the roasted ore is then immediately quenched in water and the quench liquor is concentrated so as to form crystals, we obtain green crystals which analyze:

| | Percent |
|---|---|
| $V_2O_5$ | 59.30 |
| CaO | 17.69 |
| $H_2O$ (Loss on ignition) | 23.35 | which correspond to the formula $$CaO.V_2O_5.4H_2O$$

or $$CaV_2O_6.4H_2O$$

and are practically insoluble in water, requiring 35% or stronger sulphuric acid to dissolve them. Upon reroasting the crystals at 1600° F. and quenching, they readily dissolve in water.

The process according to the present invention, may be carried out as follows: The ore crushed or comminuted to the desired fineness, say 20 mesh, is roasted in a suitable furnace at the desired temperature, usually between about 1400° F. and 1700° F., depending upon the type of ore or other material which is being treated. The roasted ore while being maintained at or near the temperature of the roast is quenched in water. The quenched ore is then ground to the desired degree of fineness with the water. The ground material is filtered yielding a filtrate containing a large proportion of the vanadium originally contained in the ore, hereafter called "quench liquor," and a residue hereafter called "quench residue." A leach of the quench residue is then made with a dilute sulphuric acid solution, say a 4% solution, and the leached material is filtered yielding a filtrate hereafter called "acid liquor" containing an additional proportion of the vanadium contained in the ore, and a final residue or tailing. The quench liquor and acid liquor are then mixed and on being heated by suitable means and stirred meanwhile, a precipitate forms, usually considered to be $V_2O_5$. This precipitate is then filtered and washed according to common practice.

The amount and condition of the calcium compounds present in the ore are important considerations in connection with the application of this process. It is mentioned above that minor differences even between different lots of ore from the same deposit may create differences in behavior during the process, unless means for handling these differences are thoroughly understood. This applied to the calcium content. These conditions are observed most particularly in vanadium ores of the roscoelite type. Occasionally a roscoelite or will be found which, although it contains calcium compounds in more than sufficient proportion to form the desired water soluble calcium vanadate ($CaO.2V_2O_5$) does not perform in the desired manner unless special precautions are taken. This appears to be due to the fact that calcium is present largely in the form of calcium carbonate. In some cases, it may be present in amount sufficient to provide much more calcium than is necessary for the formation of normal water insoluble calcium vanadate ($3CaO.V_2O_5$); it will be observed that the percentages of calcium in this latter compound is much greater than in the water soluble compound. We have found that where calcium is present in the form of minerals which will yield when subjected to our roasting procedure free lime or lime in such form as to be reactable with vanadium compounds, conversion of the vanadium content to the water insoluble calcium vanadate increases as the amount of this available free lime approaches the stoichiometric proportions necessary to form the normal water insoluble calcium vanadate. In other words, the presence of free lime tends to promote the formation at high temperature of the insoluble calcium vanadate. We have found that if excess calcium exists, for example, in the form of calcium sulphate this is not true, and the soluble calcium vanadate forms under our roasting conditions very readily. Thus in the case of those ores which contain calcium compounds but do not under our described roasting conditions produce large amounts of water-soluble calcium vanadate, they can be caused to do so by the addition of pyrite, elemental sulphur or other sulphurizing means which presumably convert the free lime into calcium sulphate. Likewise ores not containing calcium may be caused to react on roasting with the production of water-soluble calcium vanadates by the addition of lime and sulphur containing compounds. Further in the application of our process to roscoelite ores it was found in one case that an ore containing only 50% as much lime as was necessary to form the water-soluble vanadate and which netted a total recovery of only 32% of its vanadium content could be mixed in equal part with an ore containing sufficient lime to form at least $2CaO.V_2O_5$ and originally yielding only 56% of its vanadium in soluble form and when the mixture was treated by the standard procedure of our invention a combined recovery of 78% of all of the vanadium was obtained.

In order to form the water soluble calcium deuterotetra-vanadate, it is necessary that calcium sulphate or its equivalent be present in the roast to the extent of about $\frac{1}{15}$ of the vanadium content. Usually it is present in a much greater amount. In the characteristic ore, an analysis of which has been given previously, the 15.53% calcium oxide corresponds to 37.75% calcium sulphate, while only $\frac{1}{15}$ of 3.54% or 2.5% of $CaSO_4$ is necessary for the formation of the soluble calcium vanadate.

Certain of the ores contain a large amount of calcium sulphate beyond that necessary to form the water soluble calcium deuterotetra-vanadate and it has been found that this has a tendency to go into solution with the vanadium and precipitate with it to a certain extent, thus lowering the grade of the product. In treating such ores, it has been found desirable to precipitate part of the dissolved calcium sulphate from the quench liquor prior to precipitating the vanadium. This step has been illustrated in Fig. 1 but may be omitted where the amount of calcium compound present in the ore is not too great. The elimination of excess calcium can be done by adding acid liquor to the quench liquor until the mixture is slightly acid, as determined by a suitable indicator, whereupon a large proportion of the calcium sulphate is precipitated. This is then filtered off and the vanadium precipitated by adding a further quantity of the acid liquor to the filtrate, heating and stirring.

To further illustrate the process, the following example is given: The ore containing 3.01% vanadium, was ground to all pass a 20 mesh screen. It was then roasted for 105 minutes at 1650° F., and while at this temperature was quenched in water. The quenched material was then ground to 95% through 200 mesh and filtered. The filtrate was found to contain approximately 62% of the vanadium originally contained in the ore. The quench residue was leached with a 7.0% by weight solution of sulphuric acid, the acid contained in the solution amounting to 96 pounds of acid per ton of ore in the feed. The leached material was then filtered, and the acid liquor was found to contain approximately 27% of the vanadium originally contained in the ore, thus giving a total extraction of approximately 89%. Acid liquor was then added to the quench liquor until the mixture was slightly acid, thus precipitating approximately 28 pounds of calcium sulphate per ton of original feed. This calcium sulphate was then filtered off, and to the filtrate was added the remainder of the acid liquor. The mixture was then heated to approximately 180° F. and maintained at that temperature for two hours, stirring meanwhile, thus precipitating the vanadium contained in the liquors. The efficiency of precipitation was approximately 92%, thus giving an overall recovery of approximately 82% of the vanadium contained in the ore. The precipitate was then washed and dried.

Fig. 2 illustrates the effect upon the solubility of the vanadium values of roasting at different temperatures and quenching in water at the roasting temperature. The curve "dissolved in water" shows the percentage of the total initial vanadium content of the ore which is dissolved by the water in which the roasted ore is quenched, ground and leached. The curve "dissolved in 4% $H_2SO_4$" shows the percentage of the vanadium content dissolved by the sulphuric acid leach calculated as a percentage of the total initial vanadium content of the ore. The curve "total dissolved" shows the combined recovery of the water leach and the acid leach of the original vanadium content of the ore. It will be seen that at a roasting temperature of 1200° F., only 12.5% of the vanadium content is soluble in water, whereas at 1400° F., 45% of the vanadium content is soluble. Beginning at about 1400° F., and extending up to 1600° F. the solubility of the vanadium content in water increases rapidly and thereafter decreases until a temperature of about 1700° F. is reached, after which it decreases even more rapidly. The amount of the vanadium content remaining in the quench residue after the water quench which is dissolved therefrom by a 4% sulphuric acid solution reaches a minimum at about 1600° F. roasting temperature and thereafter increases rapidly as the amount of vanadium which has been dissolved in water decreases.

The total recovery for the particular ore was at a maximum at about 1700° F. roasting temperature. The curves illustrate the critical nature of the roasting and quenching temperatures, the abrupt changes in the slopes of the curves being due, it is believed, to the formation of the various calcium compounds at the different temperatures. For the particular ore on which the chart of Fig. 2 is based, it is evident that a roasting temperature of 1600° F. will produce the maximum recovery in the water quench and leach, although at 1700° F., the total recovery is somewhat more, since the amount dissolved in the sulphuric acid is somewhat greater than at 1600° F.

It will be apparent that a great economy is effected, since a large part, if not the greater part, of the vanadium can be dissolved by a cheap solvent, water, and that acid need be used only to dissolve the residuum of the vanadium content remaining in the quench residue.

The desirability of quenching the roasted ore in water while the ore is within the critical temperature range at which the water-soluble calcium vanadate exists rather than allowing the roasted ore to cool slowly below this range before quenching in water is illustrated by a comparison of Figs. 2 and 3. In Fig. 2, the roasted ore was immediately quenched in water from the temperature of the roast. In Fig. 3, the roasted ore was allowed to cool in a mass in air for five minutes before quenching in water. The curve "dissolved in water" shows the percentage of the total initial vanadium content of the ore which was dissolved by the water in which the ore was quenched. The curve "dissolved in 4% $H_2SO_4$" shows the percentage of vanadium content dissolved by the sulphuric acid leach calculated to percentage of the total initial vanadium content of the ore. The curve "total dissolved" shows the combined recovery of the water leach and the acid leach of the original vanadium content of the ore.

It will be seen from a comparison of these Figs. 2 and 3 that in Fig. 3 not only did the greater part of the vanadium content require the more expensive solvent acid, to recover it, but that the total recovery was less than when the ore was roasted to the proper temperature and immediately quenched in water, as shown in Fig. 2.

The comparative data illustrated by Figs. 2 and 3 is set forth in the following table. These results were obtained in the following manner: An ore containing 3.54% vanadium was ground to 20 mesh and roasted for a period of 90 minutes at various temperatures. At the completion of the roasting period, a portion of the discharged material was instantly quenched in cold water, and the remainder of the material was allowed to cool in air for a period of 5 minutes before quenching in water.

TABLE I

| Roasting temp., °F. | Roast instantaneously quenched, per cent of total V soluble | | | Roast cooled in air 5 min. before quenching, per cent of total V soluble | | |
|---|---|---|---|---|---|---|
| | In quench water | In 4% acid | Total | In quench water | In 4% acid | Total |
| 1000 | | | | 0.5 | 68.5 | 69.0 |
| 1100 | | | | 0.6 | 63.7 | 65.0 |
| 1200 | 12.5 | 36.32 | 48.83 | 1.78 | 40.69 | 42.47 |
| 1300 | 27.99 | 24.51 | 52.50 | 6.45 | 31.88 | 38.33 |
| 1400 | 44.75 | 23.72 | 68.48 | 10.11 | 36.32 | 46.43 |
| 1500 | 53.15 | 27.78 | 80.93 | 15.61 | 43.75 | 59.36 |
| 1600 | 62.74 | 22.90 | 85.64 | 6.98 | 57.55 | 64.53 |
| 1700 | 57.10 | 33.55 | 90.65 | 6.54 | 64.99 | 71.53 |
| 1800 | 28.89 | 59.71 | 88.60 | 8.27 | 54.37 | 62.64 |

Even a delay of 5 minutes under conditions which allow the retransformation of the water-soluble calcium vanadate into the water insoluble calcium vanadate before quenching, as shown by this table and the charts of Figs. 2 and 3, causes a marked decrease in water solubility in the vanadium which is not overcome by the subsequent acid leach.

When the proper roasting temperatures are employed in accordance with the present invention, in order to form the water-soluble deutero-tetra-vanadate, it is found that quenching in water is even superior to quenching in dilute sulphuric acid. This is shown by the following table, in which three roasts were conducted under carefully controlled conditions at 1650° F. to 1700° F. for 1½ hours and the roast instantly quenched in the respective solutions.

TABLE II

| Test No. | Procedure | Per cent total V soluble in— | | |
|---|---|---|---|---|
| | | Quench | Acid leach | Total |
| S-807 | Water quench, leach residue in 2% acid. | 64.45 | 23.48 | 87.93 |
| S-811 | Quench in 2% acid | 17.40 | | 17.40 |
| S-812 | Quench in 4% acid | 50.92 | | 50.92 |

In the specific illustrations of the process thus far referred to, the ore was quenched in water from a temperature at or near the temperature of the roast, in order to trap or retain the water soluble calcium vanadate. However, the process may be carried out in other ways. The ore may be roasted at a temperature higher than that at which it is to be quenched in water and the roasted ore may be cooled either quickly or slowly down to the quenching temperature and then quenched. The important considerations in carrying out the process are that the ore is roasted at a temperature high enough to form the water soluble calcium vanadate and that it be cooled rapidly enough from a temperature at which the water-soluble calcium vanadate still exists, so as to retain the water-soluble calcium vanadate. The following table illustrates several modifications of the procedure which may be utilized:

TABLE III

*Tests on a Peruvian ore*

| Test No. | Roasting conditions, °F. | Extraction | | |
|---|---|---|---|---|
| | | Water quench | Acid leach | Total |
| 1312 | 1600° F. (held 60 min.) quenched in water. | 64.42 | 19.12 | 83.54 |
| 1271 | ----do---- | 57.97 | 21.86 | 81.83 |
| 1313 | 1800° F. (60 m.), cool to 1600° F. in 25 min., quench in water. | 45.83 | 35.19 | 81.02 |
| 1289 | 1800° F. (90 m.), cool to 1600° F. in 60 min., quench in water. | 62.94 | 31.13 | 94.07 |
| 1314 | 1800° F. (60 m.), cool to 1400° F. in 70 min., quench in water. | 57.94 | 33.96 | 91.90 |
| 1315 | 1800° F. (60 m.), cool to 1200° F. in 130 min., quench in water. | 27.60 | 63.26 | 90.86 |
| 1281 | 1900° F. (90 m.), cool to 1600° F. in 60 min., quench in water. | 12.40 | 55.20 | 67.60 |
| 1316 | 1900° F. (20 m.), cool to 1600° F. in 42 min., quench in water. | 33.78 | 54.03 | 87.81 |

In tests Nos. 1312 and 1271, the ore was roasted at 1600° F. for 60 minutes and then quenched in water from this temperature. In the remaining tests, the ores were heated to 1800 or 1900° F. as indicated and were then cooled to different temperatures at different rates and were then quenched in water.

In general, the preferred initial heating is in the range of 1600 to 1800° F. and the preferred range from which rapid cooling takes place is in the range of 1400 to 1600° F. With some ores, the process works more satisfactorily with continued heating at 1600° F. for a suitable time, followed by rapid cooling. However, heating may be as high as 2000° F. or somewhat higher and, although the rapid cooling is usually from some temperature more than 1200° F., it may take place from a temperature as low as 1000° F. Even though a particular ore may require a roasting temperature of 1200° F. in order to form the water-soluble calcium vanadate, the soluble vanadate when once formed may be retained at a temperature somewhat lower than that required for its formation.

As noted above, the preferred procedure is heating for a sufficient length of time at about 1600° F. to cause the vanadium to be converted into the water soluble calcium vanadate and then to quench from at or near the temperature of the roast into water. However, the roast need not be immediately quenched from at or near the temperature of the roast but may be cooled quickly or slowly down to any temperature at which a considerable proportion of the vanadium is still retained in the water-soluble form and the product may then be quenched from this lower temperature. The step of quenching in water is actually two steps in one, these being the quenching and the leaching with water. The quenching may involve cooling in any medium at any rate which in a given ore is sufficiently rapid to retain after the cooling a large proportion of the vanadium in the form of the water-soluble calcium vanadate. For example, the ore may be discharged at the final temperature of the roast into a stream of cool air and if the ore is so discharged in a stream sufficiently divided, cooling at the desired rate will take place. The ore can be subsequently leached in water and yield a large proportion of its vanadium to the water used for dissolving. Actually it is found in practice that this method is not as desirable as quenching directly into water, first because of the likelihood of losses by dusting and second because it is unnecessary to have the two steps independent of each other.

The present process eliminates the necessity of employing alkaline fluxes during the roasting or leaching steps. As previously pointed out, only 96 pounds of sulphuric acid are required per ton of ore treated, or less than 5% of the weight of the ore. This low amount of acid is made possible because of the high percentage of vanadium which is extracted in the water quench. In this manner, we are able to reduce the normal acid consumption by 60%, whether used as a leaching agent or as a subsequent precipitant.

Vanadium ores averaging 4.33% in vanadium content have been treated in accordance with the present invention, with an average extraction in the water quench of 55% vanadium and in the acid leach of 38.3%, or a total extraction of 93.3% of the vanadium content. Precipitation of this vanadium has been accomplished by combining the quench liquor and the acid liquor at a precipitation efficiency of 98% to produce vanadium pentoxide analyzing 35% to 50% V as desired, depending upon the extent to which the precipitated calcium sulphate is removed in advance.

Acids other than sulphuric acid may be employed to dissolve the vanadium content of the quench residue and to precipitate vanadium pentoxide from the quench liquor. While the process has been described and developed with especial reference to the most commonly occurring alkaline earth metal, calcium, the process may be applied to ores containing other alkaline earth metals, such as magnesium, barium, strontium, and beryllium.

We have illustrated and described the preferred manner of carrying out the process. Some of the steps may be omitted under certain circumstances. Thus the grinding of the ore subsequent to the roast and water quench is not absolutely essential for the success of the process but gives superior results and is preferred. Where the ore does not contain too large amounts of calcium, its precipitation and removal may be omitted. The invention is not limited to the preferred procedure but may be practiced within the scope of the following claims.

We claim:

1. In a process for recovering vanadium values from materials containing vanadium and calcium compounds, the steps comprising roasting the materials without essential additions of alkali-metal compounds which would combine with the vanadium content to form water-soluble alkali-metal vanadates and at a temperature above that at which, upon heating, water insoluble calcium vanadates are transformed into water-soluble calcium vanadates but at a temperature below that at which there is appreciable sintering of the material, then quenching the roast in a medium which does not contain essential quantities of acid or alkali vanadium-solubilizing reagents and at a temperature at which a large proportion of the water-soluble calcium vanadates are still retained in water-soluble form and dissolving the quenched material in water which does not contain essential quantities of acid or alkaline vanadium-solubilizing reagents, and separating the soluble calcium vanadates from the residue.

2. In a process for recovering vanadium values from materials containing vanadium and alkaline earth metal compounds, the steps comprising roasting the materials without essential additions of alkali-metal compounds which would combine with the vanadium content to form water-soluble alkali-metal vanadates and at a temperature above that at which, upon heating, water insoluble alkaline earth metal vanadates are transformed into water-soluble alkaline earth metal vanadates but at a temperature below that at which there is appreciable sintering of the material, then quenching the roast in a medium which does not contain essential quantities of acid or alkaline vanadium-solubilizing reagents and at a temperature at which a large proportion of the water-soluble alkaline earth metal vanadates are still retained in water-soluble form and dissolving the quenched material in water which does not contain essential quantities of acid or alkaline-vanadium solubilizing reagents, and separating the soluble alkaline earth metal vanadates from the residue.

3. In a process for recovering vanadium values from materials containing vanadium and calcium compounds, the steps comprising roasting the materials without essential additions of alkali-metal compounds which would combine with the vanadium content to form water-soluble alkali-metal vanadates and at a temperature of at least 1200° F., in order to form water-soluble calcium vanadates, then quenching the roast in a medium which does not contain essential quantities of acid or alkaline vanadium-solubilizing reagents and at a temperature of at least 1000° F., in order to retain a substantial proportion of the water-soluble calcium vanadates in water soluble form and dissolving the quenched material in water which does not contain essential quantities of acid or alkaline vanadium solubilizing reagents, and separating the soluble calcium vanadates from the residue.

4. In a process for recovering vanadium values from materials containing vanadium and calcium compounds, the steps comprising adding material containing sulphur to the vanadium containing material, roasting said materials without essential additions of alkali-metal compounds which would combine with the vanadium content to form water-soluble alkali-metal vanadates and at a temperature above that at which, upon heating, water insoluble calcium vanadates are transformed into water-soluble calcium vanadates but at a temperature below that at which there is appreciable sintering of the material, then quenching the roast at a temperature at which a substantial proportion of the water-soluble calcium vanadates are still retained in water-soluble form and dissolving the quenched material in water which does not contain essential quantities of acid or alkaline vanadium-solubilizing reagents, and separating the soluble calcium vanadates from the residue.

5. In a process for recovering vanadium values from materials containing vanadium and calcium compounds, the steps comprising roasting the materials without essential additions of alkali-metal compounds which would combine with the vanadium content to form water-soluble alkali-metal vanadates and at a temperature at which the calcium and vanadium compounds react to form water-soluble calcium vanadates, then quenching the roast in water which does not contain essential quantities of acid or alkaline vanadium-solubilizing reagents and at a temperature at which a large proportion of the water-soluble calcium vanadates are still retained in water-soluble form, and separating the water-soluble calcium vanadates from the residue.

6. In a process for recovering vanadium values from materials containing vanadium and calcium compounds, the steps comprising roasting the materials without essential additions of alkali-metal compounds which would combine with the vanadium content to form water-soluble alkali-metal vanadates, then quenching the roast at a temperature of at least 1000° F. in water which does not contain essential quantities of acid or alkaline vanadium-solubilizing reagents, and separating the water-soluble calcium vanadates from the residue.

7. In a process for recovering vanadium values from materials containing vanadium and calcium compounds, the steps comprising roasting the materials without essential additions of alkali-metal compounds which would combine with the vanadium content to form water-soluble alkali-metal vanadates and at a temperature between 1200° F. and 2000° F. at which the calcium and vanadium compounds react to form water-soluble calcium vanadates, quenching the roast at a temperature of at least 1000° F. in water which does not contain essential quantities of acid or alkaline vanadium-solubilizing reagents, and separating the water-soluble calcium vanadates from the residue.

8. In a process for recovering vanadium values from materials containing vanadium and calcium compounds, the steps comprising roasting the materials without essential additions of alkali-metal compounds which would combine with the vanadium content to form water-soluble alkali-metal vanadates and at a temperature between 1400° F. and 1800° F. at which the calcium and vanadium compounds react to form water-soluble calcium vanadates, then quenching the roast at or near the temperature of the roast in water which does not contain essential quantities of acid or alkaline vanadium-solubilizing reagents, and separating the soluble calcium vanadates from the residue.

9. In a process for recovering vanadium values from materials containing vanadium and calcium compounds, the steps comprising roasting the materials without essential additions of alkali-metal compounds which would combine with the vanadium content to form water-soluble alkali-metal vanadates, then quenching the roast at a temperature of at least 1000° F. in water which does not contain essential quantities of acid or alkaline vanadium-solubilizing reagents, separating the quench residue from the quench liquor, leaching the quench residue with acid, separating the acid liquor from the quench residue, and mixing the acid liquor and quench liquor and heating them to precipitate vanadium oxide.

10. In a process for recovering vanadium values from materials containing vanadium and alkaline-earth-metal compounds, the steps comprising roasting the materials without essential additions of alkali-metal compounds which would combine with the vanadium content to form water-soluble alkali-metal vanadates and at a temperature at which the alkaline-earth metal and vanadium compounds react to form water-soluble alkaline-earth metal vanadates, then quenching the roast in water which does not contain essential quantities of acid or alkaline vanadium-solubilizing reagents and at a temperature at which a large proportion of the water-soluble alkaline-earth metal vanadates are still retained in water-soluble form, and separating the water-soluble alkaline-earth metal vanadates from the residue.

11. In a process for recovering vanadium values from materials containing vanadium and alkaline-earth metal compounds, the steps comprising roasting the materials without essential additions of alkali-metal compounds which would combine with the vanadium content to form water-soluble alkali-metal vanadates, then quenching the roast at a temperature of at least 1000° F. in water which does not contain essential quantities of acid or alkaline vanadium-solubilizing reagents, and separating the water-soluble alkaline-earth metal vanadates from the residue.

12. In a process for recovering vanadium values from materials containing vanadium and alkaline-earth metal compounds, the steps comprising roasting the materials without essential additions of alkali-metal compounds which would combine with the vanadium content to form water-soluble alkali-metal vanadates and at a temperature at which the alkaline-earth metal and vanadium compounds react to form water-soluble alkaline-earth metal deuterotetra-vanadate, quenching the roast in water which does not contain essential quantities of acid or alkaline vanadium-solubilizing reagents and at a temperature at which a large proportion of the water-soluble alkaline-earth metal deuterotetra-vanadate is still retained in water-soluble form, and separating the water-soluble deuterotetra-vanadate from the residue.

13. In a process for recovering vanadium values from materials containing vanadium and calcium compounds, the steps comprising roasting the materials without essential additions of alkali-metal compounds which would combine with the vanadium content to form water-soluble alkali-metal vanadates and at a temperature above that at which, upon heating, water-insoluble calcium vanadates are transformed into water-soluble calcium vanadates, then quenching the roast in water which does not contain essential quantities of acid or alkaline vanadium-solubilizing reagents and at a temperature at which a large proportion of the water-soluble calcium vanadates are still retained in water-soluble form, and separating the soluble calcium vanadates from the residue.

14. In a process for recovering vanadium values from materials containing vanadium and alkaline-earth metal compounds, the steps comprising roasting the materials without essential additions of alkali-metal compounds which would combine with the vanadium content to form water-soluble alkali-metal vanadates and at a temperature above that at which, upon heating, water-insoluble alkaline-earth metal vanadates are transformed into water-soluble alkaline-earth metal vanadates, then quenching the roast in water which does not contain essential quantities of acid or alkaline vanadium-solubilizing reagents and at a temperature at which a large proportion of the water-soluble alkaline-earth metal vanadates are still retained in water-soluble form, and separating the soluble alkaline-earth metal vanadates from the residue.

15. In a process for recovering vanadium from materials containing vanadium and calcium compounds, the steps comprising roasting the material at a temperature at which the calcium and vanadium compounds react to form water-soluble calcium vanadates, quenching the roast at or near the temperature of the roast in water, separating the quench residue from the quench liquor, leaching the quench residue with a solution of sulphuric acid, separating the acid liquor from the quench residue, mixing the acid liquor with the quench liquor until the mixed liquors are slightly acid and calcium sulphate is precipitated, filtering off the calcium sulphate, and mixing a further quantity of the acid liquor with the filtrate from the calcium sulphate, and heating them to precipitate vanadium oxide.

16. In a process for recovering vanadium from material containing vanadium and alkaline-earth metal compounds, the steps comprising roasting the material at a temperature at which the alkaline-earth metal and vanadium compounds react to form water soluble alkaline-earth metal vanadate, quenching the roast at or near the temperature of the roast in water, separating the quench residue from the quench liquor leaching the quench residue with a solution of sulphuric acid, separating the acid liquor from the quench residue, mixing the acid liquor with the quench liquor until the mixed liquors are slightly acid and alkaline-earth metal sulphate is precipitated, filtering off the alkaline-earth metal sulphate, and mixing a further quantity of the acid liquor with the filtrate from the alkaline earth metal sulphate, and heating them to precipitate vanadium oxide.

JOHN ROBERTSON.
HOLBERT EARL DUNN.
ARCHIBALD ALEXANDER SPROUL.